Inventors:
Gerald W. Urschel
and Joe R. Urschel
By Stone, Artman & Bisson
Att'ys Sept. 20, 1949.   G. W. URSCHEL ET AL   2,482,523
SLICING MACHINE
Filed Nov. 18, 1944   3 Sheets-Sheet 3
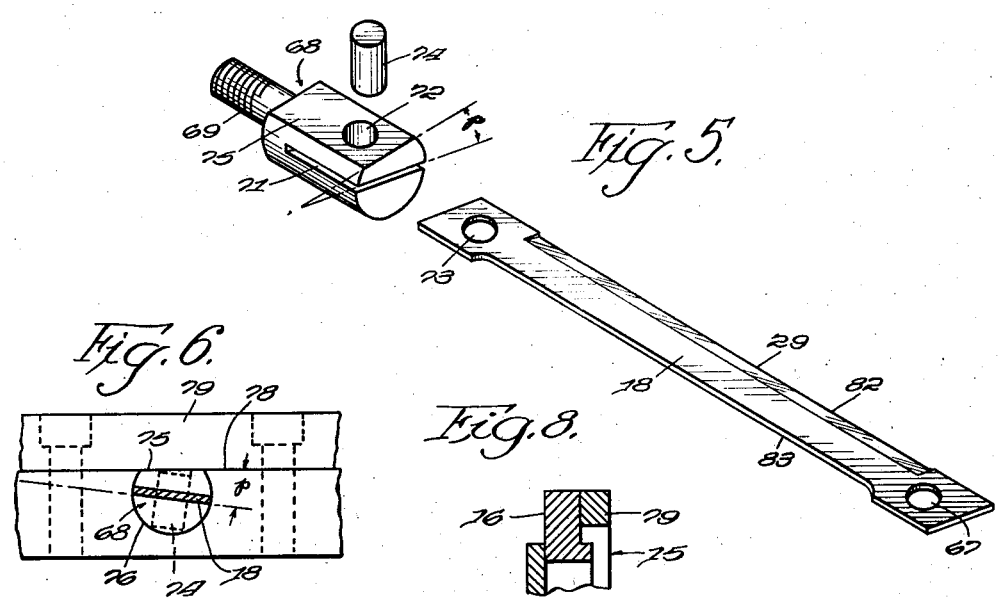
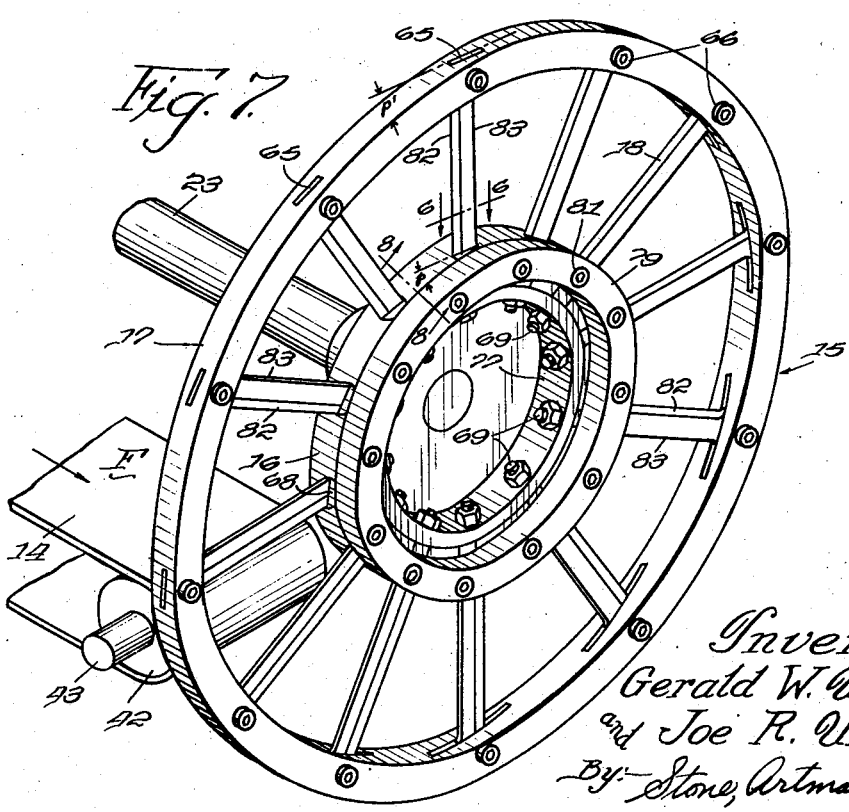
Inventors:
Gerald W. Urschel
and Joe R. Urschel
By: Stone, Artman & Bisson
Attys Patented Sept. 20, 1949

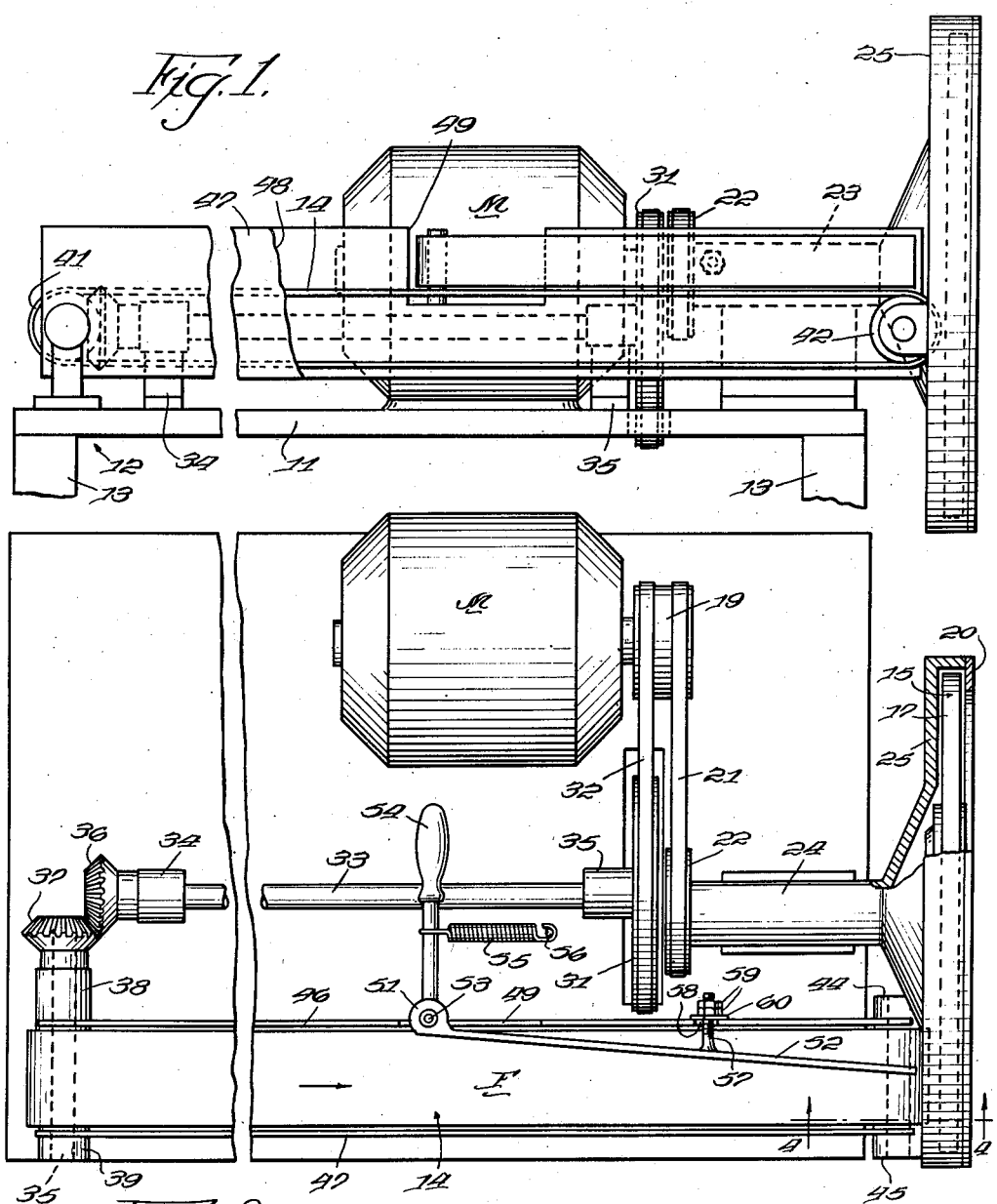

2,482,523

UNITED STATES PATENT OFFICE 2,482,523

SLICING MACHINE

Gerald W. Urschel and Joe R. Urschel,
Valparaiso, Ind.

Application November 18, 1944, Serial No. 564,029

9 Claims. (Cl. 146—110)

1

This invention concerns rotary cutter slicing machines and has to do more particularly with an improved cutter and feed therefor.

The invention is especially applicable to machines for operating upon articles in a manner that the cuts through all conform to a desired plan or arrangement, causing all slices to possess geometric similarity. In the canning industry, for example, it is customary to slice elongated articles as carrots, okra, celery and pickles transversely of their principal axes. In the past, the problem of stabilizing these articles in the desired position relatively to the knife, especially the short end portions, has not been satisfactorily met.

Heretofore, attempts have been made to feed sliceable vegetable articles across a path successively traversed by knives carried in a rotary frame. In some instances these knives have been parallel with and spaced radially from the frame axis, and in other instances the knives have extended radially from the frame axis. When operating these machines at their rated speed, the knives, because of improper shape and pitch, skew and thereby misalign the uncut end portions of diminishing mass, whereby they are chopped irregularly. Increasing the knife speed has the detrimental effect of causing them to crush and mutilate the product. Because of those working in the art failing to comprehend the relation of knife shape, knife pitch, speed of the knife carrier and speed of article feed, the machines were unsuccesssful, and, moreover, were incapable of adjustment for proper operation. Attempts to overcome the inability of these machines to satisfactorily cut the end portions of the articles have involved the use of article-holding devices including belts and wheels but they have not fulfilled the desired function.

Resort has been had to machines with article holding cradles or pockets containing parallel slots accommodating slicing knives. The necessity of manually feeding articles into these pockets increases processing cost and of course limits operating speed.

Generally, the object of this invention is the provision of a machine having a rotary series of thin knives set at a pitch which adapts them to operate at high speed upon articles propelled at high speed through a plane or zone successively traversed by the knives. Operation of the knives at the high speed, while adjusted to a pitch causing them to avoid batting and bruising the articles or the pieces cut therefrom, diminishes the tilting or skewing force components applied to the articles by the knives. By feeding the articles at greater speed into the knives, the inertia of such articles increases their stability and also decreases the time of application of the diminished tilting or skewing force components. Thus, there is a compounding of the factors contributing to improved operation; first, there is substantial diminution of the just mentioned disserviceable force components; second, the greater inertia of the articles increases their resistance to disorientation by such force components; and, third, the time of action of such force components is diminished. Collectively, these factors enable the machine to produce uniformly cut slices from the very end portions of the articles.

A more specific object is the provision of a novel cutter simulating a wheel, wherein there are concentric hub and rim elements between which thin knives are radially assembled and secured in such a fashion that the knives are drawn tautly and slightly twisted about their individual axes to incur a knife pitch gradient which is greater adjacently to the hub. This adapts the knives to compensate for the lesser linear speed of the knife portions nearer the hub whereby the knives can operate with equal efficiency throughout their length.

Another object is the provision of a unique and effective means for attaching the knife blades to and between hub and rim portions of a rotary cutter assembly.

Still another object is the provision of a new type of article feeding mechanism for directing the articles into the cutter by their own momentum.

A further object is the provision of an improved article feed for orientating elongated articles with their axes in parallelism with the path followed into the cutter.

The above and other desirable objects inherent in and encompassed by the invention will be more fully comprehended after reading the ensuing description with reference to the annexed drawings, wherein:

Fig. 1 is a side elevational view of a slicing machine constituting a preferred embodiment of the invention;

Fig. 2 is a plan view of the machine shown in Fig. 1;

Fig. 5 is a composite view illustrating a knife, a holder member for the knife and a pin for attaching the knife in the holder, all shown in a disassembled relation.

Fig. 6 is a fragmentary sectional view taken on the line 6—6 of Fig. 7 and illustrating the assembly of the parts shown in Fig. 5 within the cutter wheel.

Fig. 7 is an isometric view of the cutter wheel and feed belt of the machine; and Fig. 8 is a fragmentary sectional view taken at a plane radially intersecting the wheel hub portion as indicated by the line 8—8.

Figure 3:
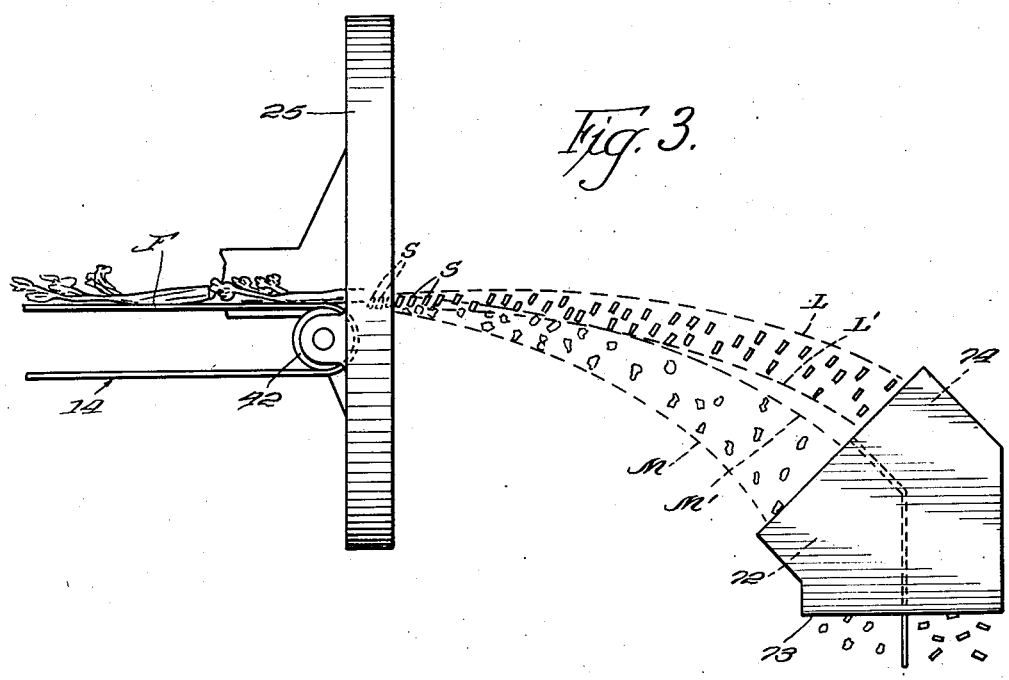
Fig. 3 is a fragmentary side elevational view, with some parts omitted for clarity, illustrating the manner in which articles to be sliced are fed into the slicer wheel and discharged therefrom in the sliced condition.

With continued reference to the drawings and particularly to Figs. 1 and 2, the moving parts of the machine can be seen to be mounted upon the top 11 of a table-like supporting frame 12 which includes any desired number of supporting uprights or legs 13.

Generally, the machine operates upon sliceable articles which are placed upon the upper flight F of a feed belt 14 which moves in the direction of the arrow shown thereon in Fig. 2 for advancing the articles axially through a cutter wheel 15 (see Fig. 7) within a zone thereof disposed between the radially outer periphery of a hub 16 (inner blade holder) and the radially inner periphery of a rim 17 (outer blade holder). The hub or inner holder 16 and the rim or outer holder 17 are regarded as a rotary blade-holding structure. The spokes of this wheel constitute knives 18 so arranged that they pass successively through each article as it traverses the wheel, such knives traversing the article at sections spaced lengthwise of the course of the article.

Both the wheel 15 and the belt 14 are driven from an electric motor M mounted upon the table top. One groove within a multi-groove pulley 19 drives a belt 21 which extends about and in turn drives a pulley 22 constrained for rotation with a drive shaft 23. This shaft 23 carries the cutter wheel 15 upon its forward end as illustrated in Fig. 7. Shaft 23 is journalled within a bearing 24 suitably mounted upon the table top and having a circular cutter wheel housing 25 formed integrally with its front end. The front end of the housing 25 is partially closed at its rim by an annular member 20 suitably secured to the front edge of the housing at its outer periphery. Housing 25 embraces the cutter wheel 15 to serve as a guard therefor and to catch any parts should they be thrown therefrom accidentally because of the high operating speeds of the wheel.

Figure 4:
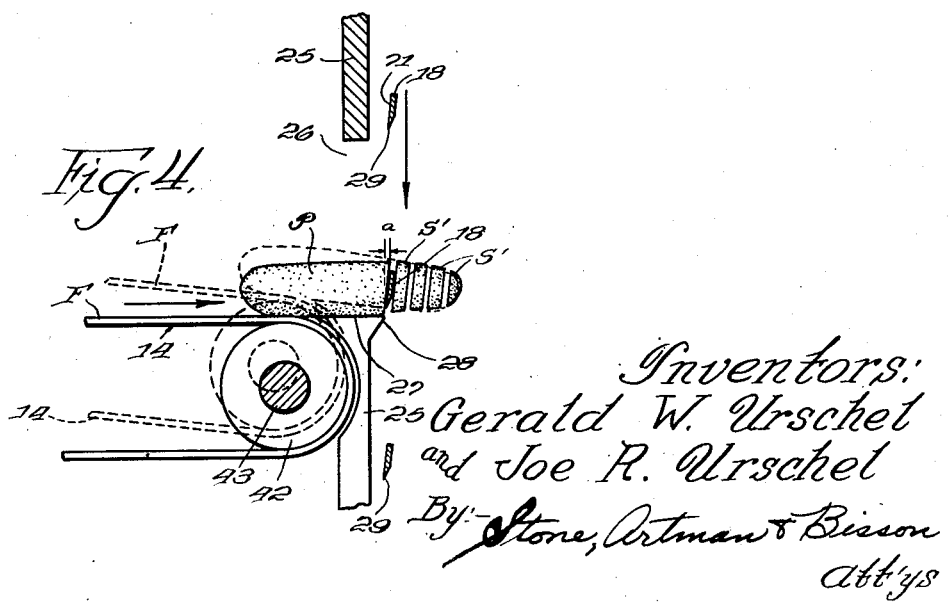
Fig. 4 is an enlarged fragmentary view taken substantially upon the line 4—4 of Fig. 2 and more clearly illustrating in detail the relation of the knives to an article being severed by the machine and further illustrating the principle of operation of the machine.

An opening 26 is formed in the housing 25 in registry with the path to be taken by articles fed into the wheel; see Fig. 4. At the lower edge of this opening 26, said housing is provided with an article transfer surface 27 flush with the upper surface of the upper belt flight. A cutting edge 28, extending radially of the cutter wheel, is formed along the front edge of the transfer surface 27 contiguously with the path traversed by the cutting edges 29 of the knives 18 for cooperation therewith in severing the articles.

A second groove upon the motor pulley 19 drives a pulley 31 (Figs. 1 and 2) through a belt 32. Belt 32 and pulley 31 are part of a power train for driving the feed belt 14. Pulley 31 is constrained for rotation with a shaft 33 which is journalled in bearings 34 and 35 and drives a belt pulley shaft 35 through companion beveled gears 36 and 37. Table top supported bearings 38 and 39 rotatively support the shaft 35 to which a drive pulley 41 for the belt 14 is rotatively fixed. An idler pulley 42 for the belt 14 is carried by a shaft 43 rotatively supported in bearings 44 and 45 carried by the wheel guard housing 25.

Sideboards 46 and 47 extend lengthwise of and project upwardly from opposite sides of the upper belt flight F. Sideboard 47 has been broken away at 48 in Fig. 1 to disclose a notch 49 in a midsection of the sideboard 46. This notch 49 is for receiving an enlarged end portion 51 of an adjustable article guide plate 52. A pivot stud 53 projecting vertically from the sideboard 46 passes through the enlarged portion 51. A handle 54 is secured to the enlarged portion 51 and is normally urged in a clockwise direction as viewed in Fig. 2 by a spring 55 having one end hooked about an anchorage pin 56 on the table top. Clockwise movement of the handle 54 and of the guide plate 52 is limited by an adjustable device comprising a threaded stud 57 suitably secured to the outer face of the guide plate and projecting outwardly through a hole 58 in the sideboard 46 where lock nuts 59 determine the limit of outward movement of a washer 60 axially of said stud. This washer abuts against the outer face of the sideboard 46 and thereby forms a stop which together with the spring 55 determines a variable space of the plate 52 from the sideboard 47 in opposed relation therewith.

The outer ends of the knife blades are inserted into radial slots 65 in the wheel rim 17. Retention of the blades in these slots is accomplished by means of cap screws 66 which pass through holes 67 (see Fig. 5) in the outer ends of the blades.

The opposite or inner ends of the blades are anchored in the wheel hub 16 by means of headed tensioning members 68 (see Fig. 5). These tensioning members have threaded shanks 69 and elongated heads each having a diametric slot 71 intersected by a hole 72 for registration with a respective hole 73 within the blade inserted into the slot, and for receiving a pin 74 which also passes through the associated blade hole 73. Each of the tensioning member heads has a flat face 75 formed at an angle to the plane of the associated slot 71. This angularity between the face 75 and the slot 71 of these tensioning member heads is for determining the pitch of the blades as will be presently more readily apparent.

In the formation of the wheel hub 16, a plurality of radial holes 76 are drilled for receiving the heads of the tensioning members 68. These holes are of substantially the same diameter as said heads. Holes 76 are counter drilled to receive the shank 69 of the headed tensioning members 68 and these shanks are sufficiently long to project radially through the counter drills past the inner periphery 77 of the wheel hub as illustrated in Fig. 7. Subsequent to the forming of the holes 76 an annular section of the hub is cut away as illustrated in Figs. 6 and 8 to leave a face 78 which intersects said holes. This face is so spaced from the diametrically opposite side of the bores or holes 76 that a ring 79 when laid against said face will fit flatly against the faces 75 of the tensioning members 68 to determine their rotative position and to prevent them from creeping out of this desired position. Set screws 81 are employed for securing the ring 79 to the hub 16 as illustrated in Figs. 6 and 7.

In Fig. 7 it can be seen that the slots 65 in the wheel rim 17 are oriented with a slight pitch so that the leading edges 82 of the blades adjacently to the rim are slightly nearer to the backside of the wheel than are the trailing edges 83 of these blades at the same transfer section. A somewhat greater pitch is provided for the blades adjacently to the wheel hub; that is, the angle $p$ (Figs. 5, 6 and 7) exceeds the angle $p'$ in Fig. 7. Greater pitch at those transverse sections of the blades nearer the hub is desired, because, during rotation of the wheel, the curvilinear speed of these sections is less than that at sections nearer the wheel rim. It will be noted that the disposition of the rim slots 65 and of the blade tensioning member slots 71 at the different angles $p'$ and $p$ cause the blades to be twisted slightly about a longitudinal axis, thereby incurring a pitch gradient for the transverse knife sections, decreasing according to the distance of these sections from the wheel hub.

The mode of operation of the machine can be readily understood from Figs. 3 and 4. In Fig. 3 the upper belt flight F which moves toward the knife structure rotating within the casing 25 is shown loaded with celery stocks. These stocks are fed endwise through the opening 26 in the rotor guard or casing member 25 and at such speed that their momentum carries them across the guide face 27 of the article supporting member 25 where the cutting edge 28 of this face 27 cooperates with the knives 18 for severing the article into slices S.

The operating principle of the machine is illustrated in detail in Fig. 4 where a pickle P is shown partially sliced. The slices which have been cut from the article P are designated S'. There is such a coordination of feeding speed for the articles as P, the rotary speed of the cutter structure and pitch of the knives 18 that as an article is fed into the knives it approaches but does not exceed one unit "$a$" of blade pitch per interval of time for the blades 18 to move a distance equal to their width (between their leading and trailing edges) circumferentially of the cutter structure. By so synchronizing the feeding speed of the articles and the rotational speed of the cutter structure and controlling this speed with respect to the knife pitch, the leading edges of the knives in traversing the articles will remove sufficient material from the ends of the unsliced portion that no part of the broad flat faces 71 of the knives will be abutted against by the severed end faces of the unsliced portions. In other words, by the time an article as P has moved a distance "$a$" (which is the pitch for the transverse section of the knife in registry with the article) the leading cutting edge of the knife will have moved a distance at least equal to the distance between the cutting and trailing knife edges. Consequently, the trailing edge of the knife and all portions of the body of the knife between the cutting and trailing edges will be moved out of registry with every section of the article being cut by the time that section is moved axially of the cutter structure a distance that would carry such section against the knife body. It follows therefore that the knife blades offer no resistance to the path followed by the articles whereby they are passed through the cutter substantially as whole bodies consisting of groups of contiguous slices. Excepting for the effect of the air in retarding the flight of these sliced bodies they follow substantially the same trajectory as unsliced bodies or articles in free flight as though the cutter structure were not present and these bodies were discharged from the belt across the guide face 28 and allowed to fall by the force of gravity.

The effect of the air upon articles such as celery stocks complete with foliage is to retard those particles or slices which have less specific gravity or which present greater surface to the air per unit of weight. The more concentrated portions or slices such as the portions of stock proper of the celery will follow a trajectory somewhat corresponding to the pattern enclosed between the lines L—L' in Fig. 3, while the lighter portions which are impeded more by the air will follow a trajectory of a pattern somewhat like that enclosed between the lines M—M'. Thus an automatic separation may be obtained between heavier and lighter parts of sliced articles, the lighter parts being directed into a lower section 72 of a receiver 73 while the particles or slices or more concentrated weight are directed into an upper section 74 of the receiver.

Since the knife blades 18 are very thin and are drawn taughtly between the rim and hub of the cutter structure, and are of a pitch so correlated with the feed speed of the articles and of the revolving speed of these knives, only negligible components of force are imparted to the articles as P transversely of their path of feed. It follows that the knives 18 do not bat, mutilate or bruise the slices nor do the knives perceptibly disturb the orientation of the articles P relatively to the knives. That is, with respect to the orientation, it is usually desired that the longitudinal axis of elongated articles shall be directed normally to the plane in which the knife blades are revolved so that these articles will be cut into transverse slices. A satisfactory feeding speed for articles has been found to be about 22 feet per second, although this speed may be varied somewhat without destroying the practical utility of the machine. When the machine is operating upon articles fed at this rate, the time interval during which force components can be applied to the articles transversely thereof by the knives is exceedingly short and this, together with the fact that these disserviceable force components have been diminished to a practically imperceptible magnitude, causes the knives to avoid twisting, tipping or skewing the articles so that in all parts of the articles, ends as well as center, the slices will be truly transverse sections of the article and possess similarity. A further factor contributing to the stability of the article while being operated upon by the knives is the high factor of inertia thereof attributable to the high linear speed of the article.

The slicing planes of the knives through the articles in addition to being made parallel as illustrated in full lines in Fig. 4 can also be made virtually perpendicular to the axis of the articles as P by inclining the article supporting surface 27 and the flight F of the feed belt into the position shown in dotted lines in Fig. 4. In the dotted line position, the article supporting face 27 is disposed within a plane perpendicular to the bodies of the knives 18 at the time they traverse the cutting edge 28 of said surface 27.

Articles fed onto the belt flight F between the sideboards 46 and 47 need not be carefully orientated. It is only necessary for them to be arranged generally lengthwise of the belt and if the articles are sufficiently long the sideboards 46 and 47 will sufficiently pre-align the articles. The article deflector member 52 is operable to improve the alignment of misaligned articles as they are carried thereagainst during movement toward the cutter structure.

Having thus described a single preferred embodiment with the view of purely illustrating the invention,

We claim:

1. In a slicing machine, a rotary structure including co-axial inner and outer blade holders, a series of thin flexible blades arranged radially of said structure between said holders and in spaced relation circumferentially thereof as the sole connecting means therebetween, each blade having a leading cutting edge and a trailing edge extending lengthwise thereof, means for anchoring outer end portions of the blades to the outer holder while disposing the cutting edges of such outer portions slightly axially of the rotary structure from the trailing edges of such outer portions, means for anchoring inner end portions of the blades to the inner holder while disposing the cutting edges of such inner end portions slightly axially of the structure from the trailing edges of such inner end portions in the same axial direction that the cutting edges of the outer end portions are disposed from their associated trailing edge portions, and means for displacing at least one of the anchorage means radially of the structure for drawing the blades taut between their inner and outer anchorage means.

2. In a slicing machine, a rotary blade-carrier frame, a series of thin flexible blades arranged radially on said frame in spaced relation circumferentially thereof and each having a leading cutting edge and a trailing edge extending lengthwise thereof, means for anchoring outer end portions of the blades to the frame while disposing the cutting edges of such outer portions axially of the frame from the trailing edges of such outer portions, means for anchoring inner end portions of the blades to the frame while disposing the cutting edges of such inner end portions axially of the frame from the trailing edges of such inner end portions in the same axial direction that the cutting edges of the outer end portions are disposed from their associated trailing edge portions, but with greater axial spacing to impart a twist to the blades and thus effect a pitch gradient wherein the pitch is less in transverse blade sections nearer the outer end portions, and means for holding the blades taut between their inner and outer anchorage means.

3. In a slicing machine, a rotary cutter comprising a hub structure, a rim structure coaxial with said hub structure and spaced radially outwardly therefrom, and means connecting the hub and rim structures consisting solely of thin flexible blades extending radially between said structures, outer connecting means connecting the outer ends of the blades with the rim structure, and inner connecting means connecting the inner ends of the blades with the hub structure, said outer connecting means being operable to hold the outer end portions of the blades with their cutting edges disposed slightly axially of the structures from their trailing edges, said inner connecting means being cooperable with the outer connecting means to hold the blades under tension, and the inner connecting means being operable to hold the inner end portions of the blades with their cutting edges disposed in the same direction from their trailing edges axially of the structure as are the cutting edges at the outer ends of the blade but by a slightly greater distance thereby placing a slight twist in the blades.

4. In a slicing machine, a rotary cutter comprising a hub structure, a rim structure coaxial with the hub structure and spaced radially outwardly therefrom, radial blade holding slots in one of said structures and disposed in respective planes arranged similarly at an angle to the plane of said structures, radially adjustable blade-holding and blade-tautness adjusting members in the other of said structures, said members being respectively mated with said slots in opposed relation therewith radially of the structures, said members also having blade holding slots in planes similarly arranged at an angle to the plane of said structures, and blades extending respectively between and secured in the slots of said blade holding members and the slots mated therewith to constitute the sole means of supporting said rim structure upon the hub structure, and said blades having leading cutting edges and trailing edges extending lengthwise thereof radially of said structures and turned at a pitch determined by the angles of said slots.

5. In a slicing machine, a rotary cutter comprising a hub structure, a rim structure coaxial with the hub structure and spaced radially outwardly therefrom, radial blade holding slots in one of said structures and disposed in respective planes arranged similarly at an angle to the plane of said structures, the other of said structures having an end face and radial bores respectively opposed to said slots radially of the structure, said bores having side wall openings formed by the intersection of such side walls by said end face, radially adjustable blade-holding and blade-tautness adjusting members in said bores for movement axially thereof pursuant to such adjustment, said members being respectively mated with said slots in opposed relation with their bores, said blade holding members having faces registerable with the bore side wall openings and also having blade holding slots disposed in planes similarly arranged to the plane of said structures at an angle predetermined by placing the faces of said members in registry with the bore side wall openings, a retaining member attachable onto said end face into engagement with said blade holding member faces to maintain their registry with the bore side wall openings, and blades extending respectively between and secured in the slots of said blade holding members and the slots mated therewith to constitute the sole means of supporting said rim structure upon the hub structure, and said blades having leading cutting edges and trailing edges extending lengthwise thereof radially of said structures and turned at a pitch determined by the angles of said slots.

6. In a slicing machine wherein sliceable articles are propelled lengthwise of and within a course, a rotary blade-carrier comprising a rim and a hub, a series of elongated thin blades arranged radially on said carrier in between the hub and rim as the sole connecting means therebetween, said blades being in spaced relation circumferentially of the carrier and each having a leading cutting edge and a trailing edge extending lengthwise thereof along opposite edges of opposite broad faces, said blades being a substantially uniform thickness within the portions thereof disposed between said faces, said carrier being disposed so the blades successively traverse said course, leading edge foremost, pursuant to carrier rotation, said blades being pitched to cause their cutting edges to traverse a less advanced portion of the course than their trailing edges, means for supporting said blades at their ends to maintain them in tension and additional means adjacent the ends of the blades to maintain said ends of the blades at different angles to cause the blades to be twisted about their respective longitudinal axes, thereby incurring a pitch gradient for the transverse knife sections of each blade decreasing according to the distance of these sections from the axis of the carrier, an article guide structure having an article supporting face in adjacent parallelism with said course in a less advanced position than said blades, said structure having a shearing edge coinciding with an edge of said article supporting face and arranged radially of the carrier in cooperative contiguity with each blade as it traverses the course, and an article feed belt having a feed flight advancing along said course in substantially flush relation with said article supporting face, and means for driving said belt at such a speed relatively to the carrier that articles carried to said article supporting face proceed thereacross by virtue of their inertia past its shearing edge into the path of said blades at a speed which is substantially one unit of blade pitch per time interval for the blades to move their width circumferentially of the carrier.

7. In a slicing machine, a rotary blade-carrier comprising a hub and a rim, a series of elongated thin blades arranged radially on said carrier between the rim and hub as the sole connecting means therebetween, said blades being in spaced relation circumferentially of the carrier and each having a leading cutting edge and a trailing edge extending lengthwise thereof along opposite edges of opposite broad faces, said blades being of substantially uniform thickness within the portions thereof disposed between said faces, said blades being pitched so their leading edges are nearer one end of the carrier than their trailing faces and their bodies between said edges are inclined to the plane of the circular path traversed thereby during carrier rotation, means for supporting said blades at their ends to maintain them in tension and additional means adjacent the ends of the blades to maintain said ends of the blades at different angles to cause the blades to be twisted about their respective longitudinal axes, thereby incurring a pitch gradient for the transverse knife sections of each blade decreasing according to the distance of these sections from the axis of the carrier and means for directing sliceable articles into the circular path traversed by said blades during carrier rotation, comprising an article guide structure having an article supporting surface at said end of the carrier and with a shearing edge arranged radially of the carrier contiguously to the blades for operating complementally therewith in slicing the articles, an article feed belt having a feed flight arranged flushly with said article supporting face, and means for driving said belt in a direction to advance said flight toward said face at such a speed relatively to the speed of the blade-carrier that articles carried to said article supporting face proceed thereacross by virtue of their inertia past its shearing edge into the path of said blades at a speed substantially equal to one unit of blade pitch per time interval for the blades to move their width circumferentially of the carrier, and said article supporting face being disposed at an angle to the plane of the circular path traversed by said blades and substantially normal to the bodies of said blades as they pass said cutting edge.

8. In a slicing machine, a rotary blade-carrier structure comprising a hub and a rim, a series of elongated blades arranged radially in said structure between the rim and hub as the sole connecting means therebetween, said blades being in spaced relation circumferentially of the carrier and each having a leading cutting edge and a trailing edge extending lengthwise thereof, said blades being thin and twistable from a relaxed substantially flat condition, and means on the carrier structure at the ends of the blades for placing the same under lengthwise tension while holding them twisted, and the twist in each of said tensioned and twisted blades being of the character that the leading edges thereof are slightly displaced in the same direction from their trailing edges axially of the carrier structure and to a slightly greater degree at their ends nearer the carrier axis than at their opposite ends.

9. In a slicing machine, a rotary blade-carrier structure comprising an outer rim and an inner hub, a series of elongated blades arranged radially in said structure in spaced relation circumferentially thereof and extending between said rim and said hub as the sole connecting means therebetween each blade having a leading cutting edge and a trailing edge extending lengthwise thereof, said blades being thin and twistable from a relaxed substantially flat condition, and means on the carrier structure at the ends of the blades for placing the same under lengthwise tension while holding them twisted, and said blade tensioning and holding means being disposed for holding the twisted and tensioned blades so both ends of their leading edges are slightly displaced in the same direction axially of the frame structure from the corresponding ends of their trailing edges but with a slightly greater displacement of the leading edges from the trailing edges at the inner ends of the blades.

GERALD W. URSCHEL.
JOE R. URSCHEL.

REFERENCES CITED

The following references are of record in the file of this patent:

UNITED STATES PATENTS

| Number | Name | Date |
| --- | --- | --- |
| 167,649 | Degroat | Sept. 14, 1875 |
| 194,370 | Pumphrey | Aug. 21, 1877 |
| 410,582 | Enoch | Sept. 10, 1889 |
| 432,845 | Wiese | July 22, 1890 |
| 623,646 | Adam | Apr. 25, 1899 |
| 1,189,702 | Kirsch | July 4, 1916 |
| 1,272,233 | Kleris | July 9, 1918 |
| 1,947,896 | Campbell | Feb. 20, 1934 |
| 2,111,189 | MacDonald | Mar. 15, 1938 |
| 2,183,224 | Norman | Dec. 12, 1939 |

FOREIGN PATENTS

| Number | Country | Date |
| --- | --- | --- |
| 303,178 | Germany | Jan. 26, 1918 |
| 303,191 | Germany | Jan. 25, 1918 |